United States Patent
Zöhrer

(10) Patent No.: US 8,062,162 B2
(45) Date of Patent: Nov. 22, 2011

(54) DIFFERENTIAL GEAR UNIT FOR MOTOR VEHICLES HAVING CONTROLLABLE DRIVING POWER DISTRIBUTION

(75) Inventor: Franz Zöhrer, Klagenfurt (AT)

(73) Assignee: Magna Steyr Fahrzeugtechnik AG & Co. KG, Graz (AT)

(*) Notice: Subject to any disclaimer, the term of this patent is extended or adjusted under 35 U.S.C. 154(b) by 360 days.

(21) Appl. No.: 12/441,679

(22) PCT Filed: Sep. 17, 2007

(86) PCT No.: PCT/EP2007/008072
§ 371 (c)(1),
(2), (4) Date: May 20, 2009

(87) PCT Pub. No.: WO2008/034572
PCT Pub. Date: Mar. 27, 2008

(65) Prior Publication Data
US 2009/0270217 A1 Oct. 29, 2009

(30) Foreign Application Priority Data
Sep. 18, 2006 (AT) ................ GM681/2006

(51) Int. Cl.
*F16H 37/02* (2006.01)
(52) U.S. Cl. ........ 475/207; 475/198; 475/201; 475/249; 192/48.614; 192/48.8
(58) Field of Classification Search .......... 475/116, 475/198, 201, 205, 207, 208, 231, 233, 235, 475/248, 249, 343; 192/48.605, 48.606, 192/48.607, 48.613, 48.614, 48.8, 48.91
See application file for complete search history.

(56) References Cited

U.S. PATENT DOCUMENTS

| 5,415,598 A * | 5/1995 | Sawase et al. ............ 475/86 |
| 5,700,222 A * | 12/1997 | Bowen ............ 475/204 |
| 5,722,305 A | 3/1998 | Sawa et al. |
| 6,360,156 B1 | 3/2002 | Morganroth et al. |
| 6,446,774 B2 * | 9/2002 | Porter ............ 192/35 |
| 7,086,982 B2 * | 8/2006 | Bowen ............ 475/225 |
| 7,520,833 B2 * | 4/2009 | Honda et al. ............ 475/248 |
| 2009/0221393 A1 * | 9/2009 | Kassler ............ 475/205 |

FOREIGN PATENT DOCUMENTS
DE 3536682 4/1986
(Continued)

*Primary Examiner* — David D Le
*Assistant Examiner* — Terry Chau
(74) *Attorney, Agent, or Firm* — Bachman & LaPointe, P.C.

(57) ABSTRACT

A differential gear unit for motor vehicles for the controllable distribution of the driving power comprises a housing and a differential gear (4) disposed therein, the gear having two speed-changing transmissions (5) drivingly connected to the output shafts (7, 8) and to the input member (14) of the differential gear, and two hydraulically controllable clutches (24, 25). In order to avoid the transmission of rotations and to be easy to mount and access, an intermediate part (26) is disposed stationary on the housing between the two clutches (24, 25), the part comprising the hydraulic actuation device (56, 58), the pressure rings (35, 45) of the clutches (24, 25) are disposed on the side facing the intermediate part (26), the outer part (30) of the first clutch (24) is drivingly connected to the speed-changing transmission (5) and to the inner part (42) of the second clutch (25) via an intermediate shaft (37), and the inner part (32) of the first clutch (24) is drivingly connected to the first output shaft (7), and the outer part (40) of the second clutch (25) is connected to the second output shaft (8).

8 Claims, 2 Drawing Sheets

FOREIGN PATENT DOCUMENTS

| | | |
|---|---|---|
| DE | 3617074 | 11/1987 |
| DE | 3642503 | 6/1988 |
| DE | 19541959 A1 | 5/1996 |
| DE | 10153758 | 6/2002 |
| DE | 102005026646 A1 | 1/2006 |
| EP | 0662402 B1 | 7/1995 |
| GB | 2321287 | 7/1998 |
| WO | 01/70533 A2 | 9/2001 |

* cited by examiner

DIFFERENTIAL GEAR UNIT FOR MOTOR VEHICLES HAVING CONTROLLABLE DRIVING POWER DISTRIBUTION

BACKGROUND OF THE INVENTION

The invention relates to a differential gear unit for motor vehicles for controllably distributing the driving force between two output shafts, composed of a housing and therein a differential gear with an input element and two output elements which have a drive connection to the output shafts, a step-up gear unit (or step-down gear unit) which has a drive connection on the drive side to the input element of the differential gear, and two adjacent, hydraulically activated controllable clutches which have a drive connection on one side to the output side of the step-down gear unit and on the other side, to one output shaft each, so that an additional torque can be imparted to the output shafts depending on the position of the friction clutches, said clutches here each having an inner part, an outer part, a laminated disk pack and a pressing-on piston.

Such differential gear units can be used both as an intermediate axle differential of an all-wheel-driven motor vehicle for distributing the driving force to the front axle and the rear axle, and also as an axle differential for distributing the driving force between the wheels of one axle. In the first case, the two output shafts have a drive connection to the axles, and in the second case they have a drive connection to the individual wheels of the axle.

EP 662 402 B1, whose subject matter is an axle differential, discloses arranging both friction clutches on the same side of the differential gear. In this arrangement, the step-up gear unit has a drive connection on the output side to the outer part which is common to the two friction clutches. However, this requires the pressure medium to be supplied separately to permit the friction clutches to be activated independently of one another by means of two rotary input elements and an unsatisfactory arrangement of the activation elements. Furthermore, in each case the inner parts of the two friction clutches are connected to an output shaft. This arrangement is difficult to mount and also difficult to access for maintenance and repair given a correspondingly divided housing.

The object of the invention is to remedy these deficiencies and to propose an arrangement which avoids the notorious rotary input elements, and which is easy to mount and access.

SUMMARY OF THE INVENTION

According to the invention, this object is achieved by providing a differential gear unit for motor vehicles for the controllable distribution of the driving power comprising a housing and a differential gear 4 disposed therein, the gear having two speed-changing transmissions 5 drivingly connected to the output shafts 7, 8 and to the input member 14 of the differential gear, and two hydraulically controllable clutches 24, 25. An intermediate part 26 is disposed stationary on the housing between the two clutches 24, 25, the part comprising the hydraulic actuation device 56, 58, the pressure rings 35, 45 of the clutches 24, 25 are disposed on the side facing the intermediate part 26, the outer part 30 of the first clutch 24 is drivingly connected to the speed-changing transmission 5 and to the inner part 42 of the second clutch 25 via an intermediate shaft 37, and the inner part 32 of the first clutch 24 is drivingly connected to the first output shaft 7, and the outer part 40 of the second clutch 25 is connected to the second output shaft 8. Since an intermediate part which is fixed to the housing and which contains the hydraulic activation means is arranged between the two clutches, the rotary input elements are dispensed with and all the elements of the hydraulic activation means, including the feed lines, are combined in a nonrotating component. The effective connection between the hydraulic activation elements in the intermediate part and the pressing-on pistons of the friction clutches is produced in a proven manner by means of axially acting roller bearings. This arrangement becomes possible by virtue of the fact that the friction clutches are arranged "mirror inverted", with the result that the outer part of the first clutch and the inner part of the second clutch are the driving primary sides. This and the arrangement of the output shafts which is possible as a result already provide an improvement for mounting and maintenance. Overall, this arrangement is independent of the design of the differential gear (planetary or bevel wheel) and of the step-up gear unit (fixed axis or planetary).

In one preferred embodiment, the intermediate part contains one annular piston on each side, which pistons act via a compression bearing on the pressing-on piston of the assigned friction clutch. Thanks to the arrangement according to the invention, annular pistons with large areas can be used to apply the pressing-on forces, and the reaction force is conducted away directly into the housing without loading any bearings whatsoever.

Furthermore, the control valves which are intended for activating the friction clutches can be connected to the intermediate part, with the result that the entire hydraulic activation means are combined in one replaceable component. It is even better if the control valves are contained in the interior of the intermediate part. This protects the valves against external effects and the installation silhouette of the differential gear unit is free of protruding parts.

In one advantageous development, the intermediate part contains an oil pump, wherein the shaft which penetrates the intermediate part has a drive connection to a rotor of the oil pump. As a result, the clutch part of the differential gear unit has its own autonomous pressurized oil source which is also already mounted in the intermediate part which contains the other hydraulic components, with the result that the connecting ducts to the valves and pressure pistons are very short and cause only negligible pressure losses.

The oil pump is preferably a pump of the gerotor type having an internal rotor on the shaft which penetrates the intermediate part, and an eccentric external rotor which is rotatably guided in the intermediate part. A particularly efficient pump is therefore provided by installing just two components in the intermediate part, with the suction space and the pressure space being formed in the intermediate part.

The intermediate part which contains all the hydraulic elements can be installed and accessed particularly easily if the part of the housing, containing the two friction clutches, has a division joint which is perpendicular to the axis and adjoined by a housing lid and the intermediate part. The intermediate part is preferably a plate which is centered, on the one hand, with respect to the housing and, on the other hand, with respect to the housing lid whose outer edge forms the housing contour. The intermediate part is therefore held in a centered fashion between the flanges of the housing and of the lid and is screwed to common bolts. It extends to the outside so that it is accessible from the outside for the connection of control lines.

BRIEF DESCRIPTION OF THE DRAWINGS

The invention will be described and explained below with reference to Figures, in which.

DETAILED DESCRIPTION

Figure 1:
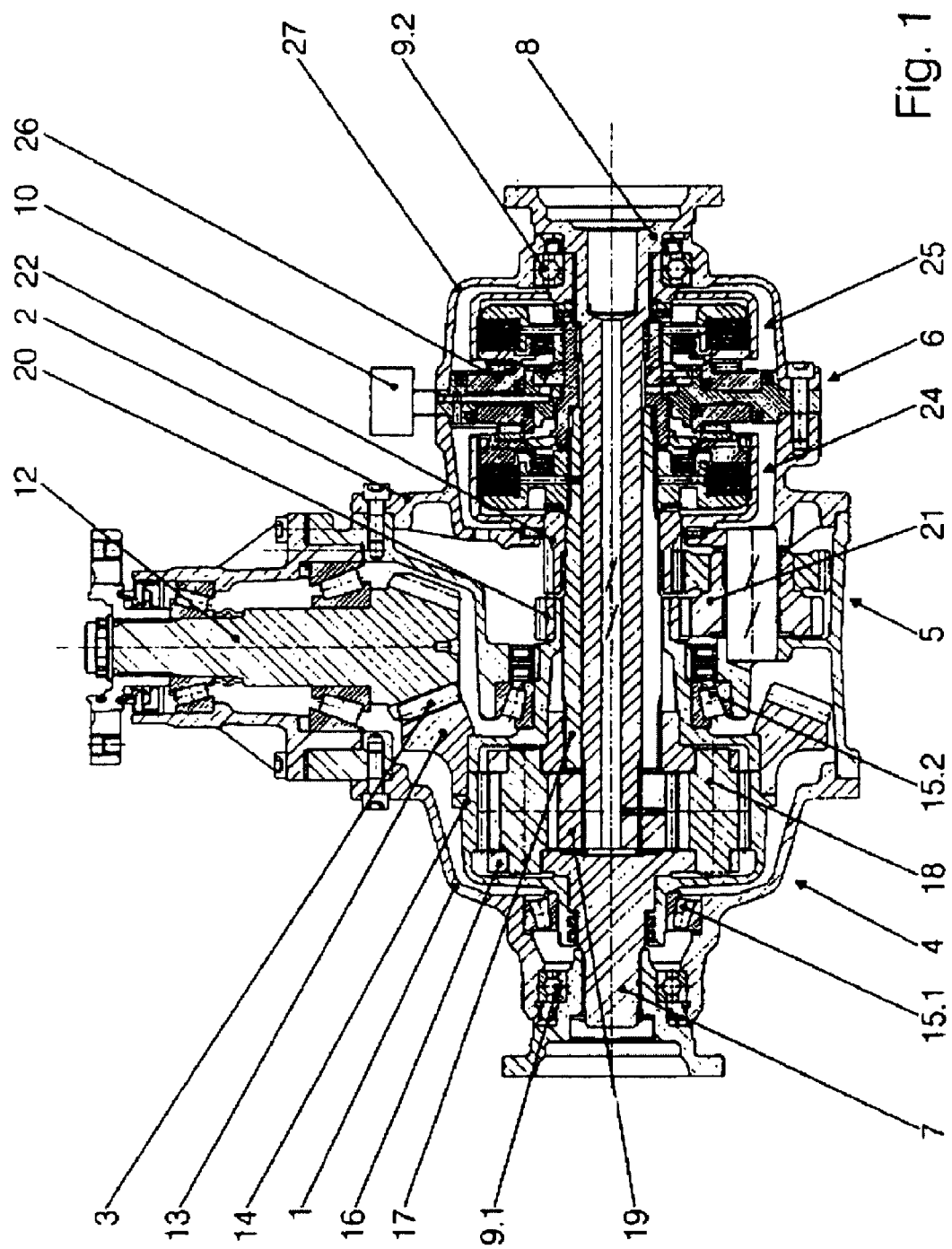
FIG. 1: shows a longitudinal section through a differential gear unit according to the invention.

In FIG. 1, the housing of a differential gear unit is denoted in its entirety by 1, independently of possible divisions, and 2 denotes only the housing part which contains the clutches. The differential gear unit is composed essentially of the following parts which are accommodated by the housing 1, 2: an input gear unit 3, here an angular gear unit, a differential gear 4, embodied here as a planetary differential, a step-up gear unit 5 and a clutch group 6 which is accommodated in the housing part 2. Furthermore, a first output shaft 7 and a second output shaft 8 are provided. In the illustrated exemplary embodiment, these lead to the wheels of an axle, but they could also each lead to one axle of the vehicle even if the differential is an intermediate axle differential of an all-wheel vehicle. The output shafts 7, 8 are centered with respect to one another in needle bearings (not denoted in more detail) and are mounted together in the housing 1, 2 by means of bearings 9.1 and 9.2. A control device 10 is only indicated, it contains control valves and/or an electronic control system.

The force flux through the differential gear unit starts here with the angular gear unit 3 which is formed by a pinion 12 and a crown gear 13. The crown gear 13 is connected in a rotationally fixed fashion to a differential housing 14 which is embodied on the inside as a ring gear and therefore forms the input element of the differential gear 4. It is mounted in the housing 1 by means of roller bearings 15.1, 15.2 and contains a planetary carrier 16 with planet gears 18 and a sun gear 19. The planetary carrier 16 is connected in a rotationally fixed fashion, on the one hand, to the first output shaft 7 and, on the other hand, to a hollow shaft 17, or is integral therewith. The sun gear 19 is connected in a rotationally fixed fashion to the second output shaft 8.

The differential gear 4 is followed in the force flux by the step-up gear unit 5. For this purpose, a drive gear wheel 20 is mounted on the side of the differential housing facing the clutch group 6. Said drive gear wheel 20 drives with a step-down or, preferably, a step-up, an output gear wheel 22 via an intermediate transmission 21, said output gear wheel 22 being already part of the clutch group 6. Said clutch group 6 is composed essentially of a first friction clutch 24, a second friction clutch 25 and an intermediate part 26 which is fixed to the housing and which contains the parts of the activation hydraulics for both clutches. The intermediate part 26 is, in its outline, a thick, plan-parallel plate which bears with one side against a locating surface 28 of the clutch housing 2. A lid 27, which is also fitted with the bearing 9.2 of the second output shaft 8, adjoins on the other side.

Figure 2:
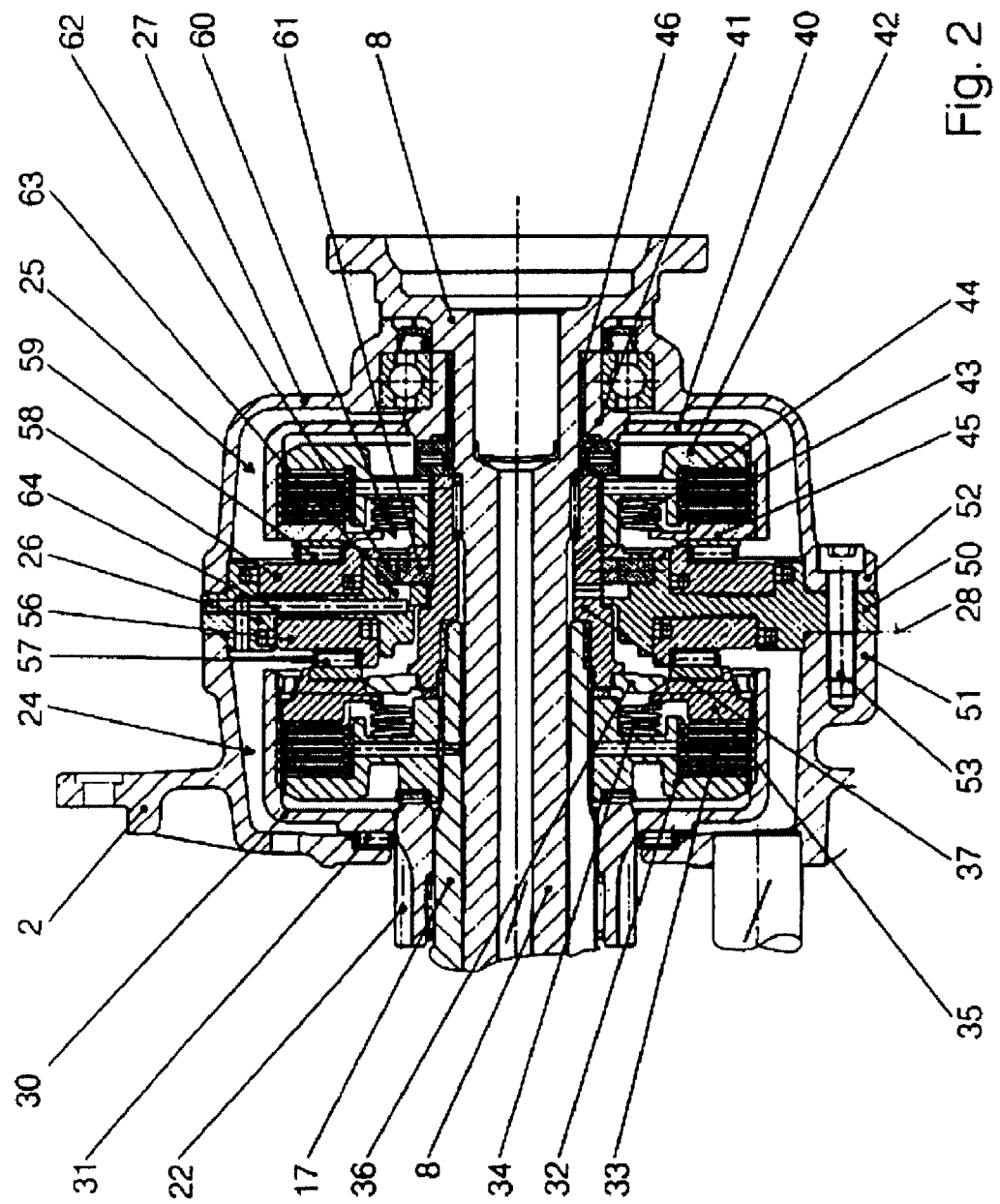
FIG. 2: shows the part thereof which contains the clutches, in an enlarged form.

The clutches 24, 25 will be described in more detail with reference to FIG. 2. The first friction clutch 24 comprises a bell-shaped outer part 30 which is supported in a step bearing 31 on the housing 2, an inner part 32 which is seated on the hollow shaft 17, a laminated disk pack 33 of customary design, a clutch spring 34 which is composed of disk springs, and a pressure ring 35. The laminated disk pack 33 which is composed of disks which are alternately connected in a rotationally fixed fashion to the outer part 30 and to the inner part 32 is compressed by means of the pressure ring 35 counter to the force of the clutch spring 34. The outer clutch part 30 is connected in a rotationally fixed fashion on its side facing away from the step bearing 31 to a clutch plate 36 which is permanently seated on an intermediate shaft 37, which is a hollow shaft which penetrates the intermediate part 26.

The second friction clutch 25 comprises an inner part 42 which is connected in a rotationally fixed fashion to the intermediate shaft 37, a laminated disk pack 43, a clutch spring 44, a pressure ring 45 and a bell-shaped outer part 40 which is connected in a rotationally fixed fashion to the second output shaft 8 by means of a hub 41 and a clutch toothing system 46.

The edge 50 of the intermediate part 26 is seated in a centered fashion between a flange 51 of the gear unit housing part 2 and a flange 52 of the lid 27. All three parts are permanently connected by means of threaded bolts 53 which are distributed over the circumference. Therefore, after the second output shaft 8 has been pulled out and the threaded bolts 53 have been released, the lid 27 and the intermediate part 26 can easily be removed. In this way, the two clutches 24, 25 are easily accessible for repair, and the intermediate part 26 which contains all the elements of the activation hydraulics can easily be replaced.

The intermediate part 26 contains, on its side facing the first friction clutch 24, a first annular piston 56 which is displaceably guided in the axial direction in a cylindrical-circular recess of the intermediate part 26. Likewise, the intermediate part contains a second annular piston 58 of the same type on its side facing the second friction clutch 25. The annular pistons 56, 58 each act on the pressure rings of the respective friction clutches 24, 25 via a compression bearing 57, 59 which is embodied here as a needle bearing.

The intermediate part 26 itself is, when considered in the axial direction, also a circular ring whose inner circle is penetrated by the intermediate shaft 37. An oil pump 60 of the gerotor type is accommodated on this inner circle. Said oil pump 60 is composed of an internal rotor 61 which is connected in a rotationally fixed fashion to the intermediate shaft 37, and of an external rotor 62 which is guided in a freely rotatable fashion and eccentrically with respect to the latter in the intermediate part 26. In the case of gerotor pumps, the internal rotor has external toothing and the external rotor has internal toothing.

Since the internal rotor 61 is connected in a rotationally fixed fashion to the intermediate shaft 37 which always rotates independently of the respective position of the clutch, a sufficient supply of oil is always ensured. The sickle-shaped suction spaces or pressure spaces 62 which are typical of the pumps of this type are also formed in the intermediate part 26 and are connected over very short distances to control valves (not illustrated) and to the cylinder spaces which contain the annular pistons. A duct 64 is shown as a symbol of these connections. The control valves, which are not illustrated individually, are either accommodated in the control box which is denoted by 10 in FIG. 1, or in the intermediate part 26 itself.

The invention claimed is:

1. Differential gear unit for motor vehicles for controllably distributing the driving force between two output shafts, comprising a housing and therein
   a) a differential gear (4) with an input element (14) and two output elements (16, 19) which have a drive connection to output shafts (7, 8);
   b) a step-up gear unit (5) which has a drive connection on the drive side to the input element (14) of the differential gear;

c) two adjacent, hydraulically controllable clutches (24, 25) which have a drive connection on one side to the output side of the step-up gear unit (5) and on the other side to one output shaft (7, 8) each, said two clutches (24, 25) each having an inner part (32, 42), an outer part (30, 40), a laminated disk pack (33, 43) and a pressure ring (35, 45);

d) an intermediate part (26) which is fixed to the housing and which contains hydraulic activation means (56, 58, 61, . . . ) is arranged between the two clutches (24, 25);

e) the pressure rings (35, 45) of the two clutches (24, 25) are on the side of the clutches facing the intermediate part (26);

f) the outer part (30) of a first clutch (24) of said two clutches, which is closer to the output side of the step-up gear unit (5), has a drive connection, on one side, to the step-up gear unit (5) and, on the other side, to the inner part (42) of the second clutch (25) via an intermediate shaft (37) which penetrates the intermediate part (26); and g) the inner part (32) of the first clutch (24) has a drive connection to the first output shaft (7), and the outer part (40) of a second clutch (25) of said two clutches has a drive connection to the second output shaft (8).

2. The differential gear unit as claimed in claim 1, wherein the intermediate part (26) contains annular piston (56, 58) on each side, which pistons act, via a compression bearing (57, 59) on the pressure ring (35, 45) of the assigned friction clutch (24, 25) of said two clutches.

3. The differential gear unit as claimed in claim 1, wherein control valves which are intended for activating the two clutches (24, 25) are connected to the intermediate part (26).

4. The differential gear unit as claimed in claim 3, wherein the control valves which are intended for activating the two clutches (24, 25) are contained in the intermediate part (26).

5. The differential gear unit as claimed in claim 1, wherein the intermediate part (26) contains an oil pump (60) whose intermediate shaft (37) which penetrates the intermediate part (26) has a drive connection to a rotor (61) of the oil pump.

6. The differential unit as claimed in claim 5, wherein the oil pump (60) is a pump of the gerotor type, an internal rotor (61) of which is seated on the intermediate shaft (37), and an eccentric external rotor (62) of which is rotatably guided in the intermediate part (26).

7. The differential gear unit as claimed in claim 1, wherein a housing part (2), containing the two clutches (24, 25), of the housing (1) has a locating surface (28) which is perpendicular to an axis of the output shafts and adjoined by the intermediate part (26) and a housing lid (27).

8. The differential gear unit as claimed in claim 7, wherein the intermediate part (26) is a plate which is centered, on the one hand, with respect to the housing part (2) which contains the two clutches (24, 25) and, on the other hand, with respect to the housing lid (27) whose outer edge (50) forms the housing contour.

* * * * *